US009483354B1

(12) United States Patent
Gharpure

(10) Patent No.: US 9,483,354 B1
(45) Date of Patent: Nov. 1, 2016

(54) TECHNIQUES FOR PROVIDING DATA MANAGEMENT USING A BACKUP DATA BANK SYSTEM

(75) Inventor: Geeta Gharpure, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 264 days.

(21) Appl. No.: 13/046,300

(22) Filed: Mar. 11, 2011

(51) Int. Cl.
*G06F 11/00* (2006.01)
*G06F 11/14* (2006.01)
(52) U.S. Cl.
CPC ....... *G06F 11/1446* (2013.01); *G06F 11/1464* (2013.01)
(58) Field of Classification Search
CPC .... G06F 11/14; G06F 17/30; G06F 11/1446; G06F 11/1464
USPC ................. 707/640, 644, 647, 652, 999.204
See application file for complete search history.

(56) References Cited

U.S. PATENT DOCUMENTS

| | | | | |
|---|---|---|---|---|
| 8,126,745 | B1* | 2/2012 | Bohanek | 705/4 |
| 2002/0095317 | A1* | 7/2002 | McCabe | 705/4 |
| 2003/0105810 | A1* | 6/2003 | McCrory et al. | 709/203 |
| 2005/0137911 | A1* | 6/2005 | Conn et al. | 705/4 |
| 2010/0083001 | A1* | 4/2010 | Shah | H04L 9/0822 713/187 |
| 2010/0250499 | A1* | 9/2010 | McAlister et al. | 707/679 |
| 2010/0269164 | A1* | 10/2010 | Sosnosky et al. | 726/7 |
| 2010/0324945 | A1* | 12/2010 | Hessing | 705/4 |
| 2010/0332401 | A1* | 12/2010 | Prahlad et al. | 705/80 |
| 2012/0131352 | A1* | 5/2012 | Gleichauf | 713/189 |
| 2012/0136936 | A1* | 5/2012 | Quintuna | G06F 21/604 709/204 |

OTHER PUBLICATIONS

Mearian, "Verizon, IBM Launch Private Cloud Backup Service," Computerworld, dated Mar. 31, 2010, Retrieved at: http://www.computerworld.com/article/9174551/Verizon_IBM_launch_private_cloud_bac.
SLIWA, "Cloud Data Backup Management: Users See New Options for Cloud Storage Administration," published Jan. 15, 2010, Retrieved at: http://searchdatabackup.techtarget.com/news/1378841/Cloud-data-backup-management-Users-see-new-options-for-cloud-storage-administration.
Winder, "SafeSync: Secure Data Backup in the Cloud for Everyone at Last?", Oct. 24, 2010, Retrieved at: http://www.daniweb.com/hardware-and-software/microsoft-windows/windows-software/reviews/320161.
CloudData Web Page, Retrieved on Jun. 1, 2011 at: http://www.clouddata.com/services/back-up.
Wikipedia Article on "Comparison of Online Backup Services," Retrieved on Jun. 1, 2011 at: http://en.wikipedia.org/wild/Comparison_of_online_backup_services.
Mozy Products Web Page, Retrieved on Jun. 1, 2011 at: http://mozy.com/products.

* cited by examiner

*Primary Examiner* — Grace Park
(74) *Attorney, Agent, or Firm* — Wilmer Cutler Pickering Hale and Dorr LLP

(57) ABSTRACT

Techniques for providing data management using a backup data bank system are disclosed. In one particular exemplary embodiment, the techniques may be realized as a method for providing data management using a backup data bank system comprising: storing, on the backup data bank system, a data directory associated with a user, receiving, from a computing resource system, a new entry for the data directory, wherein the new entry is associated with first data belonging to the user that is stored on the computing resource system, and applying, using the backup data bank system, a protection scheme to second data associated with the data directory.

19 Claims, 7 Drawing Sheets

TECHNIQUES FOR PROVIDING DATA MANAGEMENT USING A BACKUP DATA BANK SYSTEM

FIELD OF THE DISCLOSURE

The present disclosure relates generally to data management and, more particularly, to techniques for providing data management using a backup data bank system.

BACKGROUND OF THE DISCLOSURE

In recent years, Internet users have generated significant amounts of data (e.g., pictures, video clips, audio clips, blog posts) on various websites (e.g., auction websites, social networking websites, blogging websites, video sharing websites). In an attempt to protect such web data from data loss, some of these Internet users enlist cloud computing services from one or more cloud service providers. Many cloud service providers, however, do not provide data owners with many data protection configuration options.

In view of the foregoing, it may be understood that there may be significant problems and shortcomings associated with current data management technologies.

SUMMARY OF THE DISCLOSURE

Techniques for providing data management using a backup data bank system are disclosed. In one particular exemplary embodiment, the techniques may be realized as a method for providing data management using a backup data bank system comprising: storing, on the backup data bank system, a data directory associated with a user, receiving, from a computing resource system, a new entry for the data directory, wherein the new entry is associated with first data belonging to the user that is stored on the computing resource system, and applying, using the backup data bank system, a protection scheme to second data associated with the data directory.

In accordance with other aspects of this particular exemplary embodiment, the data directory may include a plurality of entries.

In accordance with further aspects of this particular exemplary embodiment, each of the plurality of entries may include a pointer to data belonging to the user.

In accordance with additional aspects of this particular exemplary embodiment, the new entry may be received via an Application Programming Interface (API).

In accordance with other aspects of this particular exemplary embodiment, the protection scheme may include a default protection scheme.

In accordance with further aspects of this particular exemplary embodiment, the protection scheme may be predefined by the user.

In accordance with additional aspects of this particular exemplary embodiment, the protection scheme may be applied in accordance with one or more protection policies.

In accordance with other aspects of this particular exemplary embodiment, the protection scheme may indicate how often the second data is backed up.

In accordance with further aspects of this particular exemplary embodiment, the backup data bank system and the computing resource system may be associated with a cloud computing environment.

In accordance with additional aspects of this particular exemplary embodiment, the may further comprise sharing, using the backup data bank system, at least a portion of the second data in accordance with one or more security settings defined by the user.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process.

In another particular exemplary embodiment, the techniques may be realized as an article of manufacture for providing data management using a backup data bank system, the article of manufacture comprising: at least one non-transitory processor readable storage medium, and instructions stored on the at least one medium, wherein the instructions are configured to be readable from the at least one medium by at least one processor and thereby cause the at least one processor to operate so as to: store, on the backup data bank system, a data directory associated with a user, receive, from a computing resource system, a new entry for the data directory, wherein the new entry is associated with first data belonging to the user that is stored on the computing resource system, and apply, using the backup data bank system, a protection scheme to second data associated with the data directory.

In another particular exemplary embodiment, the techniques may be realized as a system for providing data management using a backup data bank system comprising: one or more processors communicatively coupled to a network, wherein the one or more processors are configured to: store, on the backup data bank system, a data directory associated with a user, receive, from a computing resource system, a new entry for the data directory, wherein the new entry is associated with first data belonging to the user that is stored on the computing resource system, and apply, using the backup data bank system, a protection scheme to second data associated with the data directory.

In accordance with other aspects of this particular exemplary embodiment, the data directory may include a plurality of entries.

In accordance with further aspects of this particular exemplary embodiment, each of the plurality of entries may include a pointer to data belonging to the user.

In accordance with additional aspects of this particular exemplary embodiment, the new entry may be received via an Application Programming Interface (API).

In accordance with other aspects of this particular exemplary embodiment, the protection scheme may include a default protection scheme.

In accordance with further aspects of this particular exemplary embodiment, the protection scheme may be predefined by the user.

In accordance with additional aspects of this particular exemplary embodiment, the protection scheme may be applied in accordance with one or more protection policies.

In accordance with other aspects of this particular exemplary embodiment, the protection scheme may indicate how often the second data is backed up.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
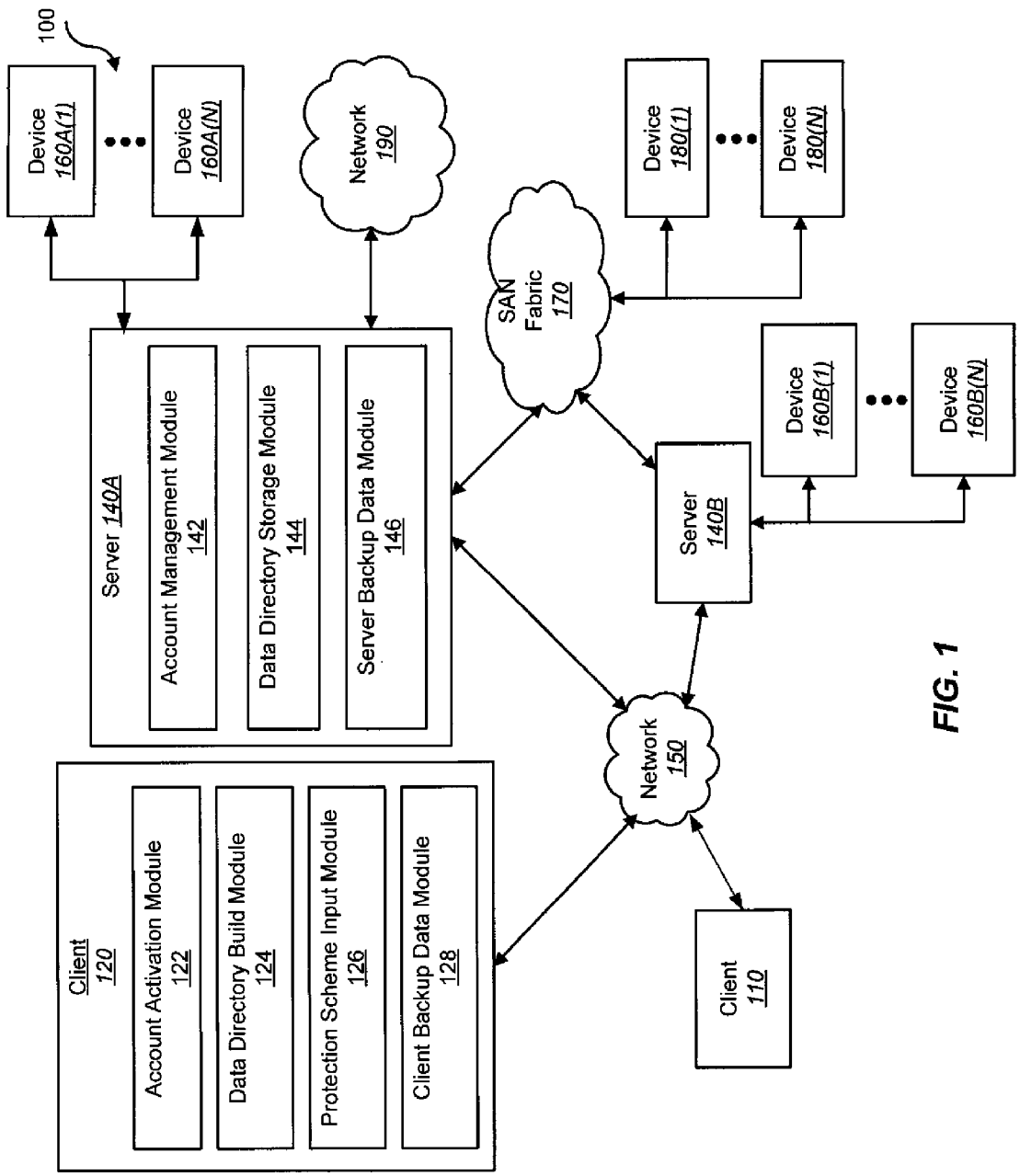
FIG. 1 shows a block diagram depicting a network architecture containing a platform for providing data management using a backup data bank system in accordance with an embodiment of the present disclosure.

Currently, an Internet user may generate or store web data (e.g., personal data, business data) on one or more websites. For example, one Internet user may store picture data (e.g., one or more pictures) on a social networking website (e.g., www.Facebook.com), video data (e.g., one or more video clips, one or more movies) on a video sharing website (e.g., www.youtube.com), and blogging data (e.g., one or more blog posts) one a blogging website (e.g., www.huffingtonpost.com). In an attempt to protect such web data from data loss, the Internet user may utilize the cloud computing services of one or more cloud service providers to ensure that the web data stored on the one or more websites is periodically backed up. Current cloud service providers, however, may focus the majority of their innovative resources on innovating robust technologies that are designed to protect database content stored on a cloud provisioned computing resource (e.g., for a small business) as opposed to web data generated or stored on websites. Accordingly, current cloud service providers may not provide an Internet user with flexible data protection configuration options (e.g., options defining how the web data is backed up, options defining how often the web data is backed up, options defining where the web data is backed up). Furthermore, an Internet user that enlists such cloud computing services may not be compensated (e.g., monetarily) in the event of a data loss (e.g., a data loss that occurs as a result of a backup failure).

In one embodiment, certain techniques for providing data management using a backup data bank system are provided. In such an embodiment, a backup data bank system may be coupled to one or more computing resource systems and one or more client devices (e.g., associated with one or more users) in a cloud computing environment. Accordingly, a user may enlist the cloud computing services of the backup data bank system to control and manage the protection of web data stored on one or more computing resource systems (e.g., one or more websites) in the cloud computing environment for a subscription fee (e.g., a monthly fee, an annual fee).

In certain embodiments, during an account activation stage (e.g., a registration stage), a backup data bank system (e.g., backup data bank server) may create and store a backup data bank account on behalf of a user in response to user input. As a result, the backup data bank system may provide the user with a unique backup data bank account number that may be used to identify the user's backup data bank account.

In certain embodiments, the backup data bank system may generate and store a data directory for each data bank account number maintained on the backup data bank system. A data directory may include data that indicates at least one pointer to data owned by a corresponding user on one or more computing resource systems. For example, a first user with a first backup data bank account may be associated with a data directory that points to web data stored on a first computing resource system and web data stored on a second computing resource system. In another example, a second user with a second backup data bank account may be associated with a data directory that points to web data stored on the first computing resource system and web data stored on a third computing resource system. In yet another example, a third user with a third backup data bank account may be associated with a data directory that points to web data stored on the second computing resource system, web data stored on the third computing resource system, and web data stored on a fourth computing resource system.

During the account activation stage (or later), the backup data bank system may allow a user to define one or more security settings, a protection scheme, or a combination of both. In one embodiment, a security setting may indicate how data associated with a data directory (e.g., owned by a user) may be shared. For example, a user may define a security setting such that a portion of data associated with a data directory is allowed to be shared with one or more pre-authorized medical professionals. In another example, a user may define a security setting such that data associated with a data directory is allowed to be shared with employees of the user.

In another embodiment, a protection scheme may define any, or a combination, of how web data associated with a user is backed up, how often web data is backed up, and where web data is backed up. For example, a user may define a protection scheme that indicates a portion of data associated with a data directory is to be backed up daily, while another portion of the data associated with the data directory is to be backed up weekly.

When a user rents or buys computing resources from a computing resource system, a user may input their unique data bank account number. A backup data bank agent stored on the computing resource system may add a new entry to the corresponding data directory stored on the backup data bank system using an Application Programming Interface (API). If, for example, the corresponding data directory is not associated with a pre-defined protection scheme, the backup data bank agent may apply a default protection scheme to the data associated with the data directory. Otherwise, the pre-defined protection scheme may be applied to data associated with the corresponding data directory.

In the event a user requests a data restore from the backup data bank system, the backup data bank system may notify a computing resource system storing the data. In the event a computing resource system requests a data restore from the backup data bank system, the backup data bank system may request approval to provide the restored data to the computing resource system from a user that owns the data.

If a data loss occurs, the backup data bank system may compensate a user that owns the data loss. For example, the backup data bank system may monetarily compensate the user based on the amount of data loss. In another example, the backup data bank system may monetarily compensate the user based on the amount of productivity lost as a result of the data loss.

FIG. 1 shows a block diagram depicting a network architecture 100 containing a platform for providing data management using a backup data bank system in accordance with an embodiment of the present disclosure. FIG. 1 is a simplified view of network architecture 100, which may include additional elements that are not depicted. Network architecture 100 may contain client 110, client 120, server 140A, as well as server 140B (one or more of which may be implemented using computer system 200 shown in FIG. 2). Client 110, client 120, server 140A, and server 140E may be communicatively coupled to a network 150. Server 140A may be communicatively coupled to storage devices 160A(1)-(N), and server 140B may be communicatively coupled to storage devices 160B(1)-(N). Server 140A may contain one or more modules for providing data management using a backup data bank system including an account management module 142, a data directory storage module 144, and a server backup data module 146. Server 140A and server 140B may be communicatively coupled to a SAN (Storage Area Network) fabric 170. SAN fabric 170 may support access to storage devices 180(1)-(N) by server 140A and server 140B, and by client 110 and client 120 via network 150. Server 140A may be communicatively coupled to network 190. Client 120 may contain one or more modules for providing data management using a backup data bank system including an account activation module 122, a data directory build module 124, a protection scheme input module 126, and a client backup data module 128.

Figure 2:
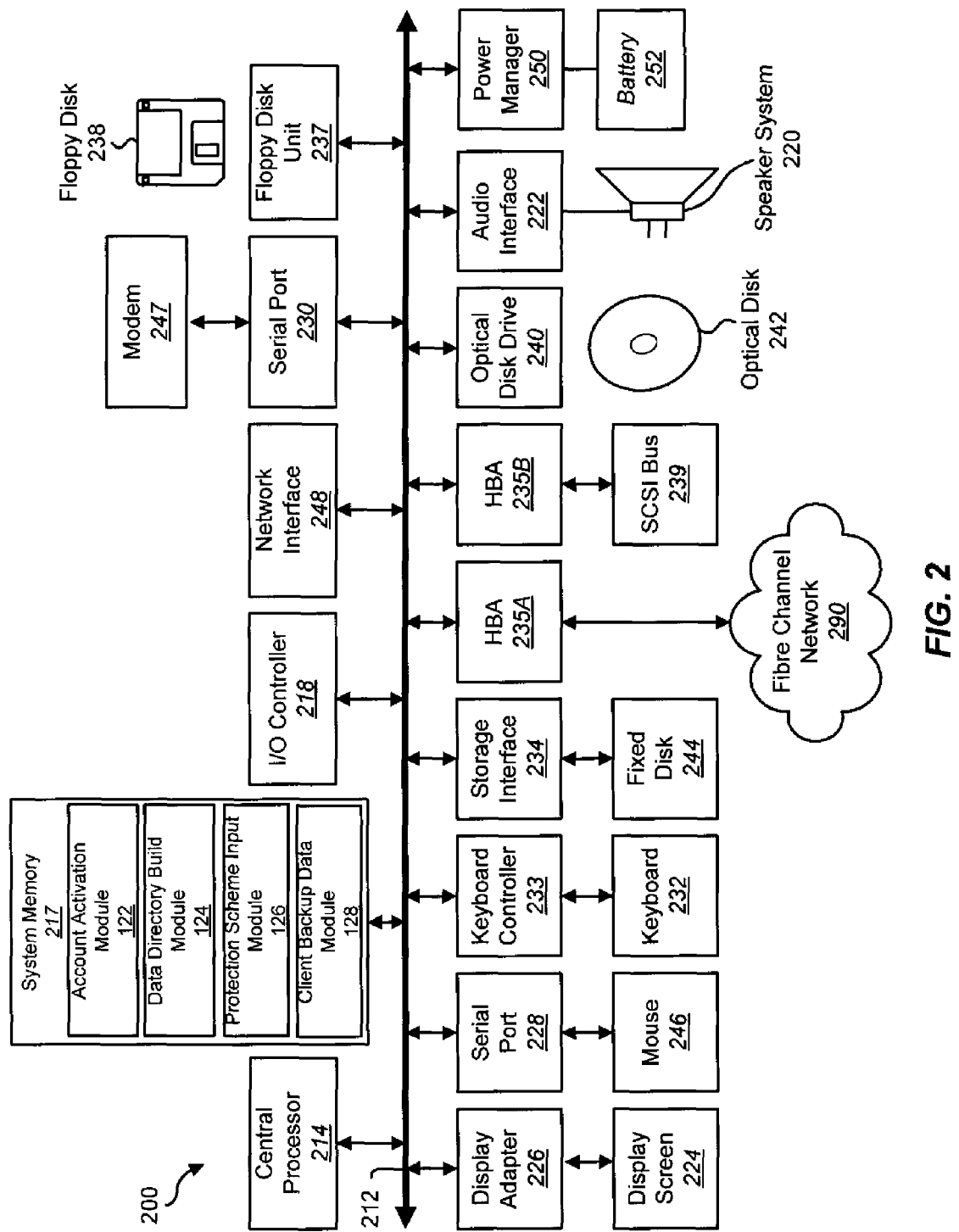
FIG. 2 depicts a block diagram of a computer system in accordance with an embodiment of the present disclosure.

With reference to computer system 200 of FIG. 2, modem 247, network interface 248, or some other method may be used to provide connectivity from one or more of client 110 and client 120 to network 150. Client 120 may be able to access information on server 140A or server 140B using, for example, a web browser or other client software. Such a client may allow client 120 to access data hosted by server 140A or server 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, client 120, server 140A, server 140B, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to client 110, client 120, server 140A, or server 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup, replication, or archival purposes.

According to some embodiments, client 110 and client 120 may be a smartphone, PDA, desktop computer, a laptop computer, a server, another computer, or another device coupled via a wireless or wired connection to network 150. Client 110 and client 120 may receive data from user input, a database, a file, a web service, and/or an application programming interface.

Server 140A and server 140B may be application servers, archival platforms, backup servers, backend servers, network storage devices, media servers, email servers, document management platforms, enterprise search servers, or other devices communicatively coupled to network 150. Server 140A and server 140B may utilize one of storage devices 160A(1)-(N), 160B(1)-(N), and/or 180(1)-(N) for the storage of application data, replication data, backup data, or other data. Server 140A and server 140B may be hosts, such as an application server, which may process data traveling between client 110 and client 120 and a backup platform, a backup process, and/or storage. According to some embodiments, server 140A and server 140B may be platforms used for backing up and/or archiving data.

Account activation module 122, data directory build module 124, protection scheme input module 126, client backup data module 128, account management module 142, data directory storage module 144, and a server backup data module 146 are discussed in further detail below.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, account activation module 122, data directory build module 124, protection scheme input module 126, and client backup data module 128 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
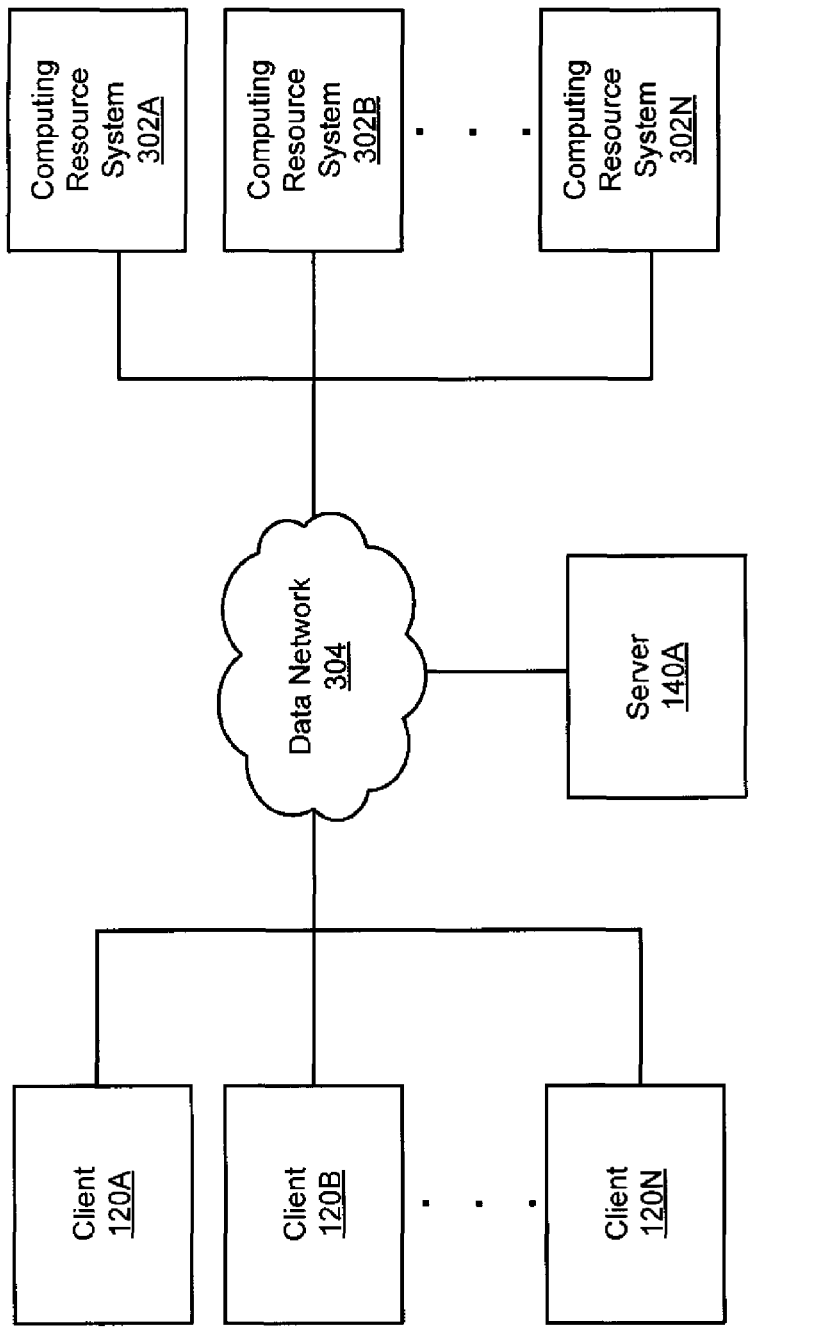
FIG. 3 depicts a cloud computing environment in accordance with an embodiment of the present disclosure.

FIG. 3 depicts a cloud computing environment 300 in accordance with an embodiment of the present disclosure. As illustrated in FIG. 3, a cloud computing environment may communicatively couple clients 120A, 120B, 120N, computing resource systems 302A, 302B, 302N (e.g., one or more websites, one or more web servers), and a server 140A (e.g., backup data bank system) via a data network 304. It should be noted that multiple servers may be included in the cloud computing environment. The server 140A may provide one or more cloud computing services that are configured to control and manage the protection of web data stored on computing resource systems 302A, 302B, 302N in the cloud computing environment 300 for a subscription fee (e.g., a monthly fee, an annual fee).

For example, a first user associated with client device 120A may access server 140A to create a backup data bank account and receive a backup data bank account number. Thereafter, when the user rents or buys computing resources from any, or a combination, of computing resource systems 302A, 302B, 302N, the user may input their backup data bank account number into the corresponding computing resource system 302 to add a new entry to a data directory maintained and stored on server 140A on behalf of the user. Accordingly, data associated with the new entry may be protected in accordance with a protection scheme enforced by the server 140. Client 120, computing resource system 302, server 140A are discussed in further detail below.

Figure 4:
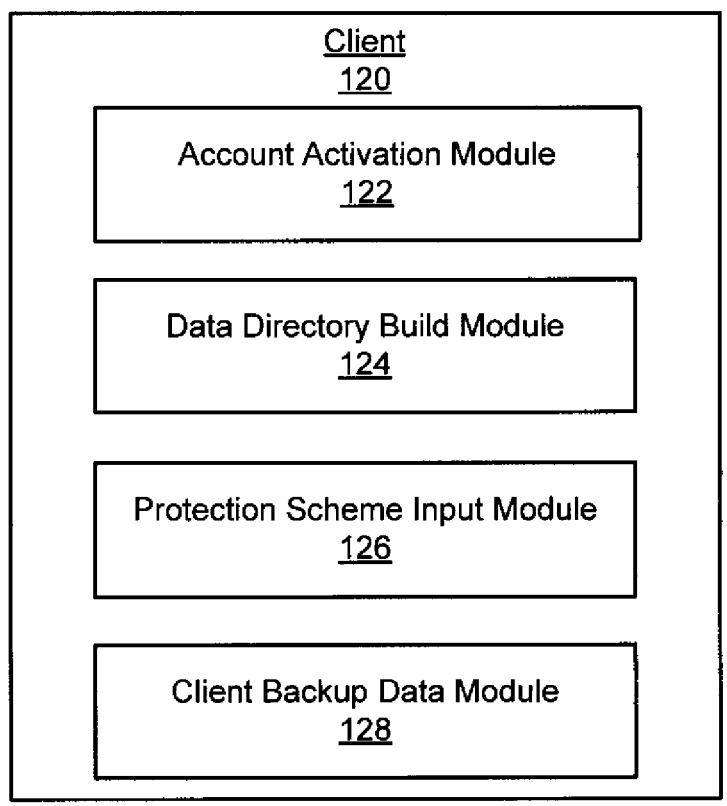
FIG. 4 shows modules of a client in accordance with an embodiment of the present disclosure.

FIG. 4 shows modules of a client 120 in accordance with an embodiment of the present disclosure. As illustrated, the client 120 may contain one or more components including an account activation module 122, a data directory build module 124, a protection scheme input module 126, and a client backup data module 128.

The description below describes network elements, computers, and/or components of a system and method for providing data management using a backup data bank system that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Account activation module 122 may be configured to allow a user of client 120 to activate a backup data bank account during a registration stage. As a result of activating the backup data bank account, the user may be provided with a unique backup data bank account number. Such a unique number may be used to identify the user's backup data bank account in one or more subsequent transactions (e.g., modifying a protection scheme, defining a security setting, adding a new entry to a data directory).

Account activation module 122 may also be configured to allow a registered user (e.g., with a backup data bank account) to input (e.g., define) one or more security settings during the registration stage or at a later time. In one embodiment, a security setting may indicate how data associated with a data directory (e.g., owned by a user) may be shared. For example, a user may define a security setting that allows a portion of data associated with a data directory to be shared with one or more pre-authorized medical professionals. In another example, a user may define a security setting that allows data associated with a data directory to be shared with employees of the user. In yet another example, a user may define a security setting that does not allow any data associated with a data directory to be shared.

Protection scheme input module 126 may be configured to allow a user input (e.g., define) a protection scheme for a corresponding data directory. In another embodiment, a protection scheme may define any, or a combination, of how web data associated with a user is backed up, how often web data is backed up, and where web data is backed up. For example, the protection scheme input module 126 may allow a user to define a protection scheme that indicates that a portion of data associated with a corresponding data directory is to be backed up daily. In another example, the protection scheme input module 126 may allow the user to define a protection scheme that indicates that another portion of the data associated with the corresponding data directory is to be backed up weekly. If, for example, a protection scheme is not pre-defined by a user, a default protection scheme may be applied to data associated with a data directory.

As a result of a backup data bank account being created for a user, a data directory associated with the backup data bank account may also be created. A data directory may include one or more pointers to data owned by a user and stored on one or more computing resource systems (e.g., computing resource systems 302A, 302B, 302N). For example, a data directory associated with a user with a backup data bank account may include a first pointer that points to web data stored on a first computing resource system, a second pointer that points to web data stored on a second computing resource system, and a third pointer that points to web data stored on a third computing resource system.

Data directory build module 124 may be configured to allow a user to add a new entry to a corresponding data directory. When a user rents or buys computing resources from a computing resource system (e.g., computing resource system 302), a user may input their unique data bank account number into the computing resource system. A backup data bank agent stored on the computing resource system may add a new entry to the corresponding data directory (e.g., a corresponding data directory stored on a backup data bank system). Accordingly, a user may build a data directory by adding one or more new entries for data stored on one or more computing resource systems.

Client backup data module 128 may be configured to allow a user to request a data restore from a backup data bank system (e.g., server 140A) in the event a data loss occurs. For example, a data loss may occur on a client device (e.g., client 120) associated with the user. As a result, the user may request that the backup data bank system restore the data that was lost during the data loss.

Client backup data module 128 may also be configured to allow a user to request an immediate backup of at least a portion of data associated with a corresponding data directory. Accordingly, the client backup data module 128 may allow the user to indicate which data is to be backed up during the immediate backup procedure. The client backup data module 128 may also allow the user to indicate what time data is to be backed up during an immediate backup procedure.

Figure 5:
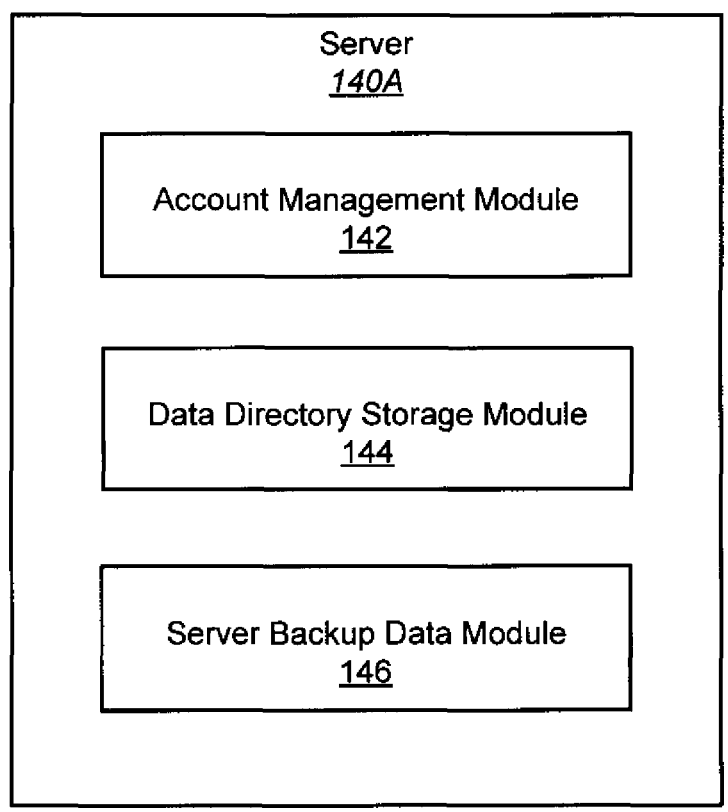
FIG. 5 shows modules of a server in accordance with an embodiment of the present disclosure.

FIG. 5 shows modules of a server 140A in accordance with an embodiment of the present disclosure. As illustrated, the server 140A may contain one or more components including an account management module 142, a data directory storage module 144, and a server backup data module 146.

The description below describes network elements, computers, and/or components of a system and method for providing data management using a backup data bank system that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Account management module 142 may be configured to create (e.g., store) a backup data bank account on behalf of a user of a client device (e.g., client 120) during a registration. Accordingly, the account management module 124 may generate a unique backup data bank account number for each backup data bank account created. As a result, the account management module 124 may store a plurality of backup data bank accounts associated with a plurality of users. Each backup data back account stored in the account management module 142 may be identifiable via the unique backup data bank account number generated for a particular backup data bank account.

During or after a registration stage, the account management module 142 may allow a user to define one or more security settings, a protection scheme, or a combination of both. Accordingly, the account management module 142 may associate one or more security settings, a pre-defined protection scheme, or a combination of both with a particular user and a corresponding backup data bank account.

Data directory storage module 144 may be configured to store a data directory for each backup data bank account maintained on server 140A. For example, a first backup data bank account may be associated with a data directory that includes a first pointer that points to web data stored on a first computing resource system and a second pointer that points to web data stored on a second computing resource system. In another example, a second backup data bank account may be associated with a data directory that includes a first pointer that points to web data stored on the first computing resource system and a second pointer that points to web data stored on a third computing resource system. In yet another example, a third backup data bank account may be associated with a data directory that includes a first pointer that points to web data stored on the second computing resource system, a second pointer that points to web data stored on the third computing resource system, and a third pointer that points to web data stored on a fourth computing resource system.

As a user adds new data to be protected using a backup data bank system (e.g., server 140A), new entries may be added to a corresponding data directory. A new entry may be received via an API coupled to the backup data bank system (e.g., server 140A) and a computing resource system storing data associated with the new entry.

Server backup data module 146 may be configured backup data associated with each data directory in accordance with a corresponding protection scheme. In one embodiment, the server backup data module 146 may access the account management module 142 to determine whether a pre-defined protection scheme exists for a particular data directory. If, for example, the server backup data module 146 determines that a pre-defined protection scheme is associated with the data directory, the server backup data module 146 may backup data associated with the data directory in accordance with the pre-defined protection scheme. If, however, the server backup data module 146 determines that a pre-defined protection scheme is not associated with the data directory, the server backup data module 146 may backup data associated with the data directory in accordance with a default protection scheme.

A default protection scheme may be defined by one or more implementers of the backup data bank system (e.g., server 140A) based on design preferences. In one embodiment, the default protection scheme may indicate that data associated with a data directory is to be backed up daily. In another embodiment, the default protection scheme may indicate that data associated with a data directory is to be backed up weekly.

Server backup data module 146 may be configured to backup data associated with a data directory in accordance with one or more protection policies. A protection policy may indicate a technique for backing up certain types of data. In one embodiment, a protection policy may indicate that data associated with an entry in a data directory that is less than a maximum size (e.g., maximum size threshold) is to be backed up by storing a copy of the data on a storage device of the backup data bank system (e.g., server 140A). Accordingly, the server backup data module 146 may initiate the transmission of a copy of the data to the backup data bank system (e.g., server 140).

In another embodiment, a protection policy may indicate that data associated with an entry in a data directory that is greater than a minimum size (e.g., minimum size threshold) is to be backed up by storing a copy of the data on a storage device of the computing resource system that stores the original data. Accordingly, the server backup data module 146 may initiate the copying of the data onto a storage device of the corresponding computing resource system.

Server backup data module 146 may be configured to restore data in response to a restore request from a user, a computing resource system, or a combination of both. In one embodiment, the server backup data module 146 may seek approval from a user associated with the data (e.g., a data owner) to provide the restored data to the computing resource system in response to receiving a restore request from a computing resource system. If approval is granted, the server backup data module 146 may provide the restored data to the requesting computing resource system. If approval is denied, the server backup data module 146 may not provide the restored data to the requesting computing resource system.

The server backup data module 146 may notify a corresponding computing resource system (e.g., storing the original data) in response to receiving a restore request from the user. Accordingly, the server backup data module 146 may provide the restored data to the requesting user.

Figure 6:
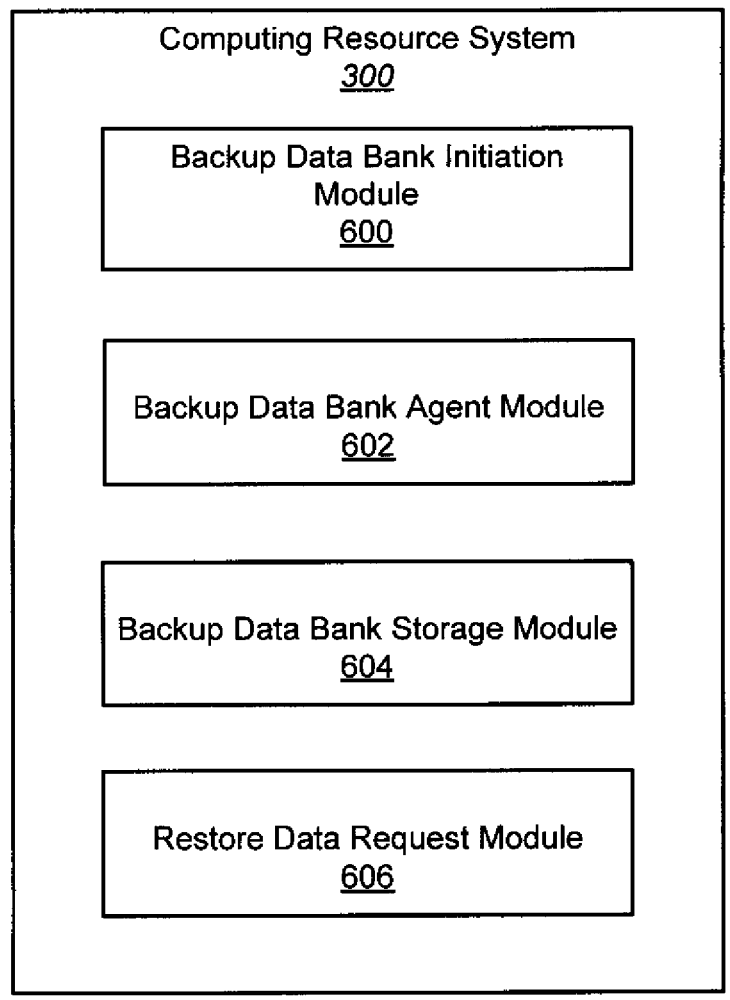
FIG. 6 shows modules of a computing resource system in accordance with an embodiment of the present disclosure.

FIG. 6 shows modules of a computing resource system 300 in accordance with an embodiment of the present disclosure. As illustrated, the computing resource system 300 may contain one or more components including a backup data bank initiation module 600, a backup data bank agent module 602, a backup data bank storage module 604, and a restore data request module 606.

The description below describes network elements, computers, and/or components of a system and method for providing data management using a backup data bank system that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Backup data bank initiation module 600 may be configured to allow a user to input a backup data bank account number to initiate the cloud computing services provided by the backup data bank system (e.g., server 140A). For example, a user may own data (e.g., web data) stored on the computing resource system 300. Accordingly, the user may input their backup data bank account number into the backup data bank initiation module 600 to allow the backup data bank system (e.g., server 140A) to control and manage the protection of the data (e.g., web data) stored on the computing resource system 300.

Backup data bank agent module 602 may be configured to store a backup data bank agent. The backup data bank agent may be configured to detect the input of a backup data bank account number into the backup data bank initiation module 600 by a user. In response to such a detection, the backup data bank agent may invoke an API to add a new entry to a data directory associated with the user. The new entry may be associated with the data stored on the computing resource system 300.

Backup data bank storage module 604 may be configured to store a copy of data stored on the computing resource system 300 in response to a backup data procedure initiated by the backup data bank system. Accordingly, the backup data bank storage module 604 may maintain backup storage to store backup copies of original data on the computing resource system 300.

Restore data request module 606 may be configured to allow the computing resource system 300 to request a data restore from a backup data bank system (e.g., server 140A) in the event a data loss occurs. For example, a data loss may occur on the computing resource system 300. As a result, the computing resource system 300 may request that the backup data bank system restore the data that was lost during the data loss.

Figure 7:
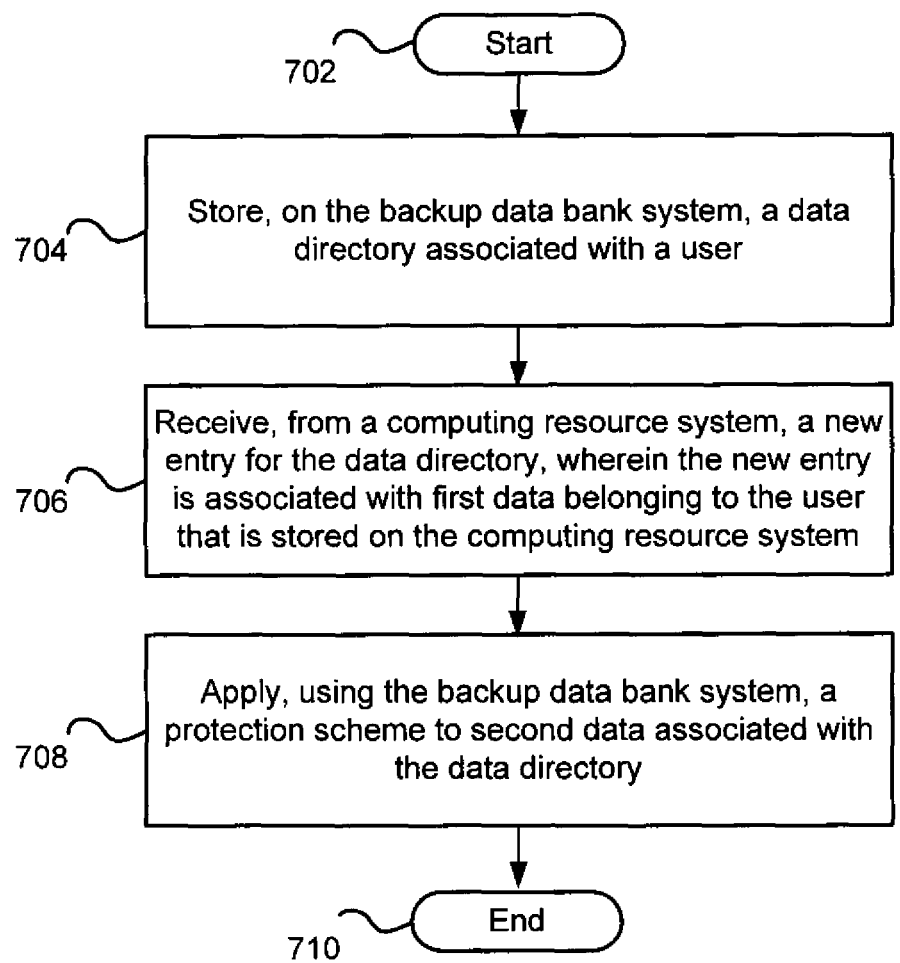
FIG. 7 depicts a method for providing data management using a backup data bank system in accordance with an embodiment of the present disclosure.

FIG. 7 depicts a method for providing data management using a backup data bank system in accordance with an embodiment of the present disclosure.

At block 704, a data directory associated with a user is stored on the backup data bank system. The data directory may include a plurality of entries. Each entry of the data directory may include a pointer that points to data (e.g., web data) on a computing resource system (e.g., computing resource system 300).

At block 706, a new entry for the data directory that is associated with first data belonging to the user that is stored on the computing resource system is received from the computing resource system. The new entry may include a pointer that points to data (e.g., web data) on the computing resource system.

At block 708, a protection scheme is applied to second data associated with the data directory using the backup data bank system. In one embodiment, the protection scheme may include a pre-defined protection scheme. In another embodiment, the protection scheme may include a default protection scheme.

At block 710, the method 700 may end.

At this point it should be noted that providing data management using a backup data bank system in accordance with the present disclosure as described above may involve the processing of input data and the generation of output data to some extent. This input data processing and output data generation may be implemented in hardware or software. For example, specific electronic components may be employed in a server backup data module or similar or related circuitry for implementing the functions associated with providing data management using a backup data bank system in accordance with the present disclosure as described above. Alternatively, one or more processors operating in accordance with instructions may implement the functions associated with providing data management using a backup data bank system in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for providing data management using a backup data bank system, the method comprising:
   receiving a request from a user to acquire computing resources on the backup data bank system, in response to inputting a unique data bank account number associated with the user;
   storing, on the backup data bank system, a data directory associated with the user;
   receiving, from a first web site, a first new entry for the data directory, wherein the first new entry is associated with first web data belonging to the user that is stored on the first web site;
   applying, using the backup data bank system, a protection scheme to second web data associated with data belonging to the user that is stored on a second web site, wherein the protection scheme causes the second web data to be backed up to a second new entry for the data directory at regular intervals;
   sharing, using the backup data bank system, at least a portion of the second web data with a party not associated with an employer of the user in accordance with one or more security settings defined by the user;
   receiving, at the backup data bank system, a request for a data restore, wherein the data restore is executed if the user associated with the data directory approves the request;
   determining, using the backup data bank system, an amount of data loss in the event of the data loss; and
   compensating, using the backup data bank system, the user in the event of the data loss, wherein the compensation is based at least in part on the determined amount of data loss, wherein the compensating comprises refunding at least a portion of previous compensation from the user for the computing resources on the backup data bank system.

2. The method of claim 1, wherein the data directory comprises a plurality of entries.

3. The method of claim 2, wherein each of the plurality of entries comprise a pointer to web data belonging to the user, wherein the pointer to the web data is received from a web site storing the web data for the user.

4. The method of claim 1, wherein the first new entry is received via an Application Programming Interface (API).

5. The method of claim 1, wherein the protection scheme comprises a default protection scheme.

6. The method of claim 1, wherein the protection scheme is predefined by the user.

7. The method of claim 1, wherein the protection scheme is applied in accordance with one or more protection policies.

8. The method of claim 1, wherein the protection scheme indicates how often the second web data is backed up.

9. The method of claim 1, wherein the backup data bank system and the first web site are associated with a cloud computing environment.

10. At least one non-transitory processor readable storage medium for storing a computer program of instructions configured to be readable by at least one processor for instructing the at least one processor to execute a computer process for performing the method as recited in claim 1.

11. An article of manufacture for providing data management using a backup data bank system, the article of manufacture comprising:
   at least one non-transitory processor readable storage medium; and
   instructions stored on the at least one medium;
   wherein the instructions are configured to be readable from the at least one medium by at least one processor and thereby cause the at least one processor to operate so as to:
      receive a request from a user to acquire computing resources on the backup data bank system, in response to inputting a unique data bank account number associated with the user;
      store a data directory associated with the user;
      receive a first new entry for the data directory, wherein the first new entry is associated with first web data belonging to the user that is stored on a first web site;
      apply a protection scheme to second web data associated with data belonging to the user that is stored on a second web site, wherein the protection scheme causes the second web data to be backed up to a second new entry for the data directory at regular intervals;

share, using the backup data bank system, at least a portion of a backup of the second web data with a party not associated with an employer of the user in accordance with one or more security settings defined by the user;

receive a request for a data restore, wherein the data restore is executed if the user associated with the data directory approves the request;

determine an amount of data loss in the event of the data loss; and compensate the user in the event of the data loss, wherein the compensation is based at least in part on the determined amount of data loss, wherein the compensating comprises refunding at least a portion of previous compensation from the user for the computing resources on the backup data bank system.

12. A system for providing data management using a backup data bank system, the system comprising:

one or more processors communicatively coupled to a network, wherein the one or more processors are configured to:

receive a request from a user to acquire computing resources on the backup data bank system, in response to inputting a unique data bank account number associated with the user;

store a data directory associated with the user;

receive a first new entry for the data directory, wherein the first new entry is associated with first web data belonging to the user that is stored on a first web site;

apply a protection scheme to second web data associated with data belonging to the user that is stored on a second web site, wherein the protection scheme causes the second web data to be backed up to a second new entry for the data directory at regular intervals;

share, using the backup data bank system, at least a portion of the second web data with a party not associated with an employer of the user in accordance with one or more security settings defined by the user;

receive a request for a data restore, wherein the data restore is executed if the user associated with the data directory approves the request;

determine an amount of data loss in the event of the data loss; and compensate the user in the event of the data loss, wherein the compensation is based at least in part on the determined amount of data loss, wherein the compensating comprises refunding at least a portion of previous compensation from the user for the computing resources on the backup data bank system.

13. The system of claim 12, wherein the data directory comprises a plurality of entries.

14. The system of claim 13, wherein each of the plurality of entries comprise a pointer to web data belonging to the user, wherein the pointer to the web data is received from a web site storing the web data for the user.

15. The system of claim 12, wherein the first new entry is received via an Application Programming Interface (API).

16. The system of claim 12, wherein the protection scheme comprises a default protection scheme.

17. The system of claim 12, wherein the protection scheme is predefined by the user.

18. The system of claim 12, wherein the protection scheme is applied in accordance with one or more protection policies.

19. The system of claim 12, wherein the protection scheme indicates how often the second web data is backed up.

* * * * *